(12) United States Patent
Kim

(10) Patent No.: US 7,958,852 B2
(45) Date of Patent: Jun. 14, 2011

(54) ONCE-THROUGH BOILER

(75) Inventor: Sang-Gon Kim, Seoul (KR)

(73) Assignee: Sung-Gon KIM, Ansan, Kyunggi-Do (KR)

( * ) Notice: Subject to any disclaimer, the term of this patent is extended or adjusted under 35 U.S.C. 154(b) by 469 days.

(21) Appl. No.: 11/572,100

(22) PCT Filed: Jul. 12, 2005

(86) PCT No.: PCT/KR2005/002243
§ 371 (c)(1),
(2), (4) Date: Jan. 12, 2007

(87) PCT Pub. No.: WO2006/006821
PCT Pub. Date: Jan. 19, 2006

(65) Prior Publication Data
US 2007/0163521 A1  Jul. 19, 2007

(30) Foreign Application Priority Data

Jul. 13, 2004  (KR) .................. 10-2004-0054539

(51) Int. Cl.
*F22B 35/10* (2006.01)
(52) U.S. Cl. .................. 122/1 B; 122/18.1; 122/235.23
(58) Field of Classification Search .................. 122/1 B, 122/18.1, 19.1, 406.4, 235.23, 249, 251
See application file for complete search history.

(56) References Cited

U.S. PATENT DOCUMENTS

| 1,366,207 | A | * | 1/1921 | Nicholson ..................... 122/5 |
| 1,882,211 | A | * | 10/1932 | Curran et al. ............... 122/479.5 |
| 2,571,540 | A | * | 10/1951 | Clarkson ...................... 122/411 |
| 2,832,673 | A | * | 4/1958 | Larson et al. .................. 436/38 |
| 4,073,267 | A |   | 2/1978 | Hunt et al. |
| 4,357,910 | A | * | 11/1982 | Blockley et al. ............... 122/248 |

FOREIGN PATENT DOCUMENTS

| JP | 61-256101 | 11/1986 |
| JP | 2004-089791 | 3/2004 |
| KR | 2019820001184 | 6/1982 |
| KR | 2019850005277 | 8/1985 |
| KR | 2019850008914 | 11/1985 |
| KR | 1020010021146 | 3/2001 |

* cited by examiner

*Primary Examiner* — Gregory A Wilson
(74) *Attorney, Agent, or Firm* — Christopher Paul Mitchell

(57) ABSTRACT

Disclosed herein is a once-through boiler capable of achieving a steep increase in temperature of steam via reheating of the steam within a combustion chamber, thereby improving heat and energy efficiency. The boiler comprises a body (110), a steam supply unit (120), and a heating unit (130). The body includes a housing (111), a cover (112), and a guide pipe (113). The steam supply unit includes an annular water tank (122) in a lower region of the body, a steam supply chamber (124) in an uppermost region of the body, water pipes (121) amounted on the water tank, a low-temperature steam inlet pipe (125) and a high-temperature steam outlet pipe (127) mounted at opposite sides of the water pipes, and a steam heating pipe (126) to communicate the inlet pipe with the outlet pipe. The heating unit includes a burner (131), and a combustion chamber (132).

3 Claims, 4 Drawing Sheets

[Fig. 1]
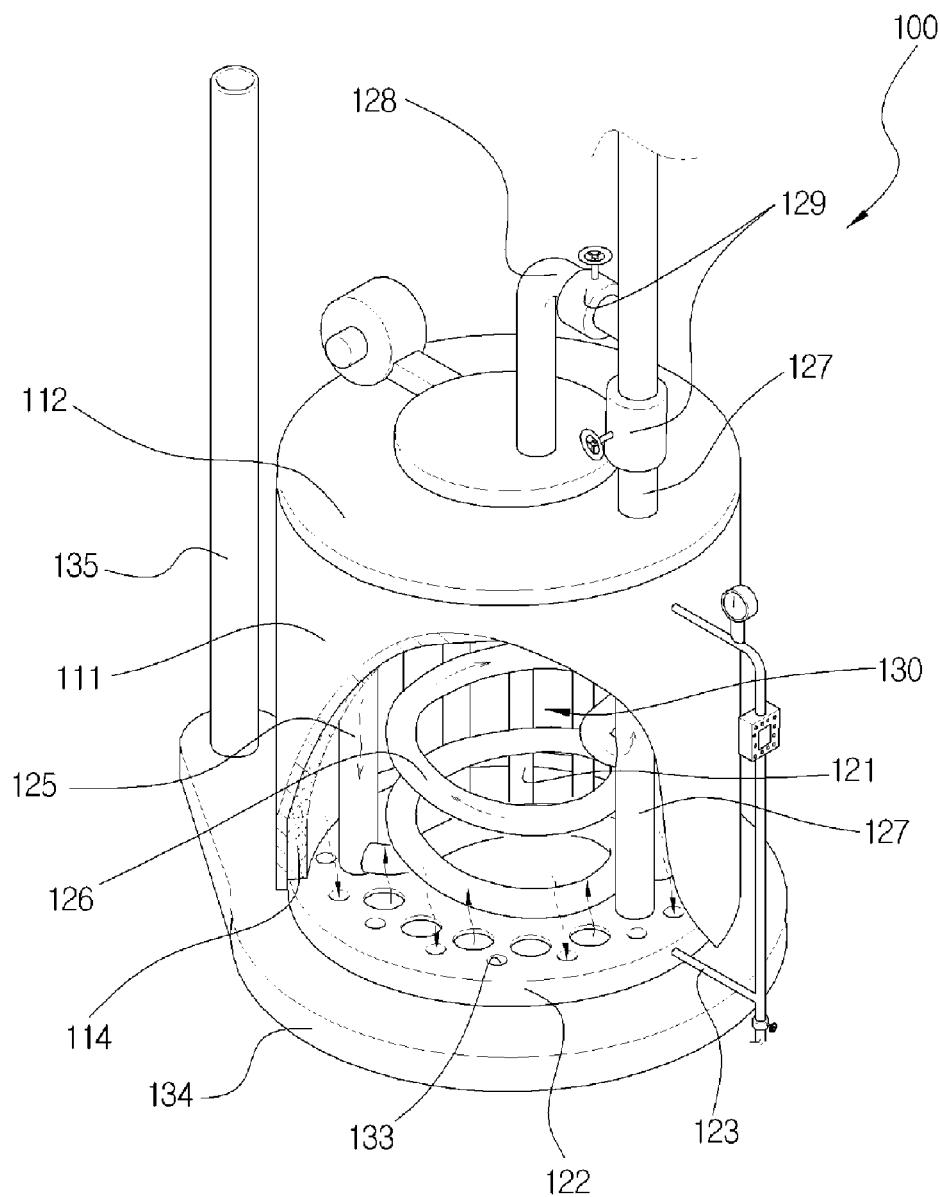

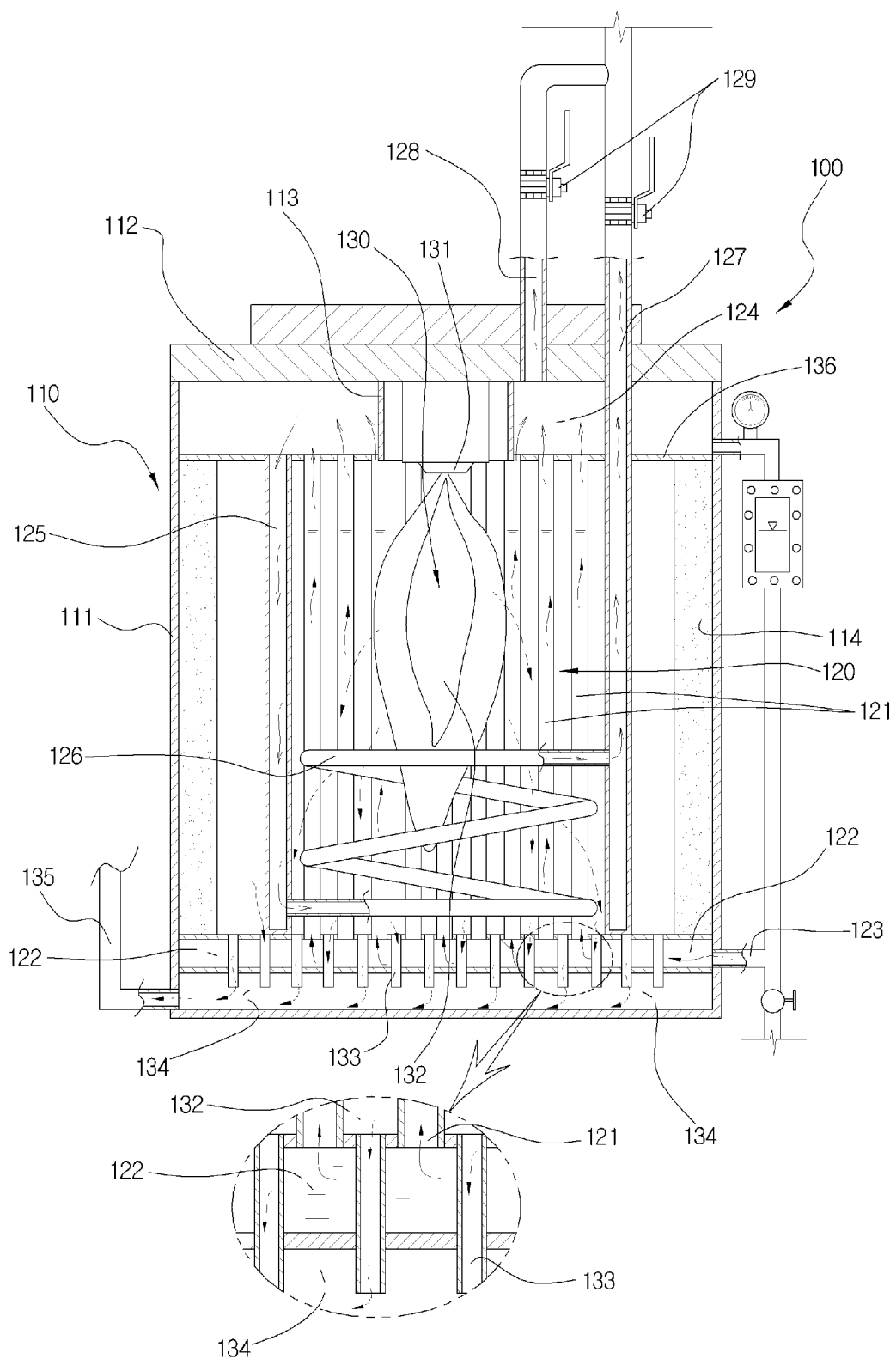
[Fig. 2]

[Fig. 3]
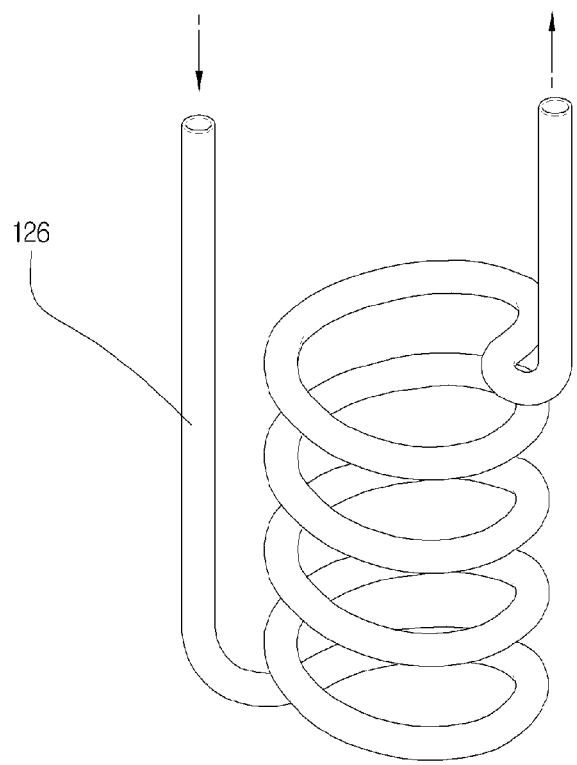
[Fig. 4]
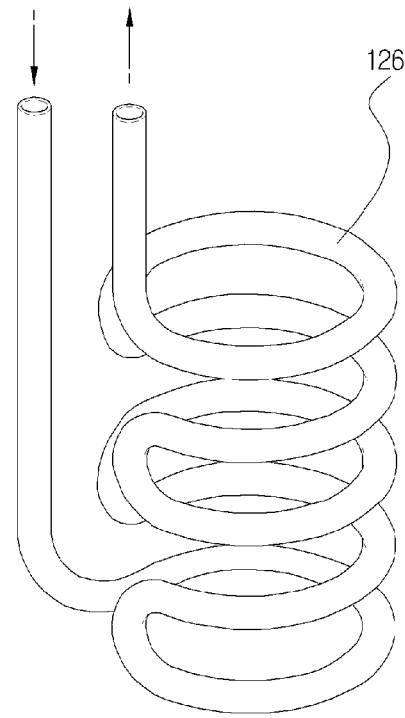

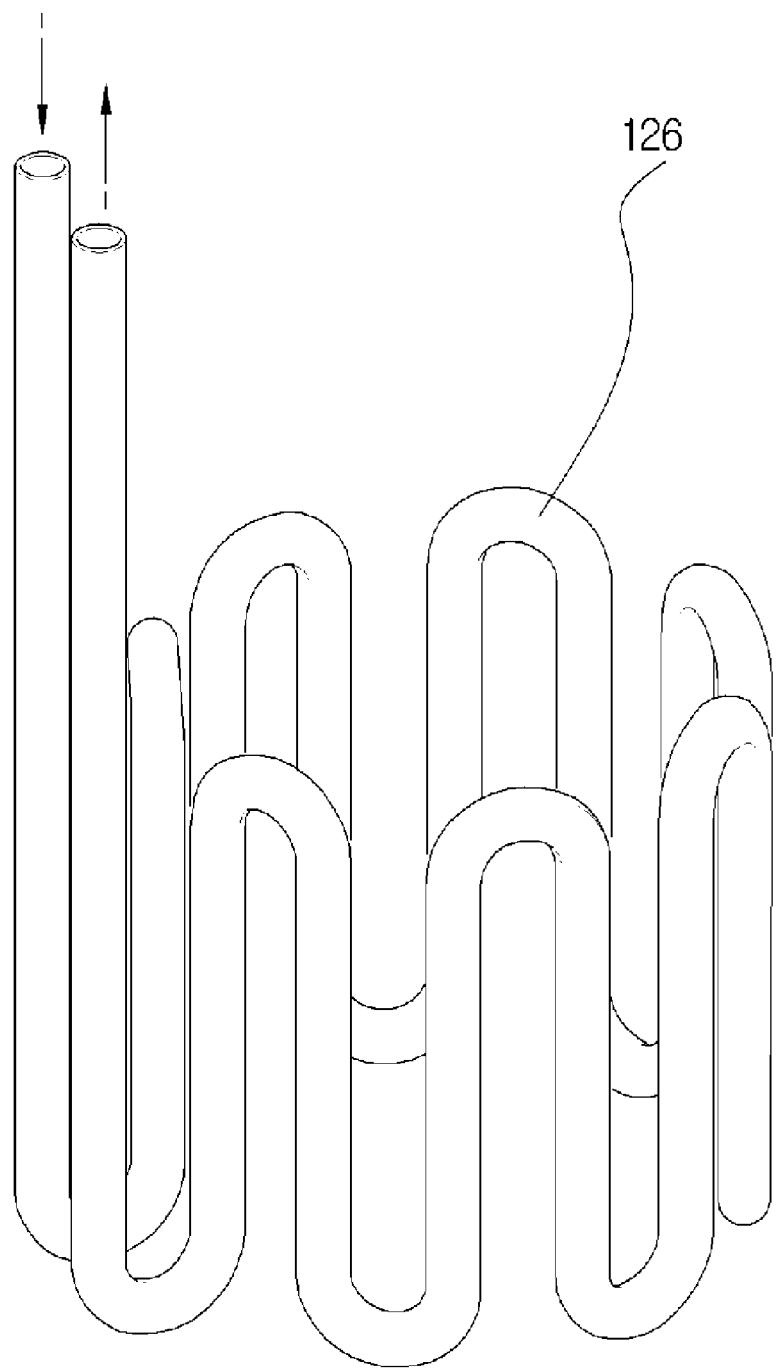
[Fig. 5]

ONCE-THROUGH BOILER

TECHNICAL FIELD

The present invention relates to a once-through boiler, and, more particularly, to a once-through boiler which circulates a primarily generated steam into a combustion chamber to obtain a high-temperature steam even at low-pressure, thereby reducing fuel and time required to generate the steam as well as equipment costs, and increasing operational safety.

BACKGROUND ART

Generally, a boiler is an apparatus designed to transfer combustion heat of fuel to water, etc., to thereby generate high-temperature and high-pressure steam. The boiler is widely used to supply the high-temperature and high-pressure steam to steam engines of thermal power plants and ships, etc., and other working and heating devices of various factories.

The boiler may be classified into various types based on a structure thereof. As one type of boiler, a once-through boiler, in the form of a forced circulation boiler, is made up of only pipes, including a water pipe and elongated bent pipe. The once-through boiler, so-called a forced once-through boiler, is operated such that water, supplied to one end of an elongated pipe, is heated, evaporated, and superheated in this sequence while passing through the pipe by pumping, thereby being discharged from the other end of the pipe as superheated steam. The once-through boiler is suitable to generate high-pressure steam, and especially, is advantageous for use as a super-critical pressure boiler.

In tandem with automatic control technique, the once-through boiler has been recently developed to achieve easy handling and high efficiency with small-capacity thereof. Also, the once-through boiler is able to generate high-pressure and high heat-capacity steam. For this reason, nowadays, the once-through boiler is widely used as a domestic or industrial boiler, for example, as a domestic heating boiler, spa equipment, or the like.

In the once-through boiler, water vapor, contained in combustion gas to be discharged to the outside, comes into contact with a heat exchanger to thereby be condensed. This enables recovery of latent heat of approximately 10%, realizing a high-efficiency apparatus.

However, the conventional once-through boiler has a problem in that it provides relatively low-temperature steam lower than 100 degrees Celsius. Since steam tends to gradually decrease in temperature as it is delivered to a heating device or engine, the relatively low-temperature steam of the conventional once-through boiler is insufficient to provide a desired standard temperature suitable for domestic or industrial facilities, resulting in a deterioration of heat efficiency thereof.

To obtain steam having a higher temperature, therefore, the conventional once-through boiler has been adapted to raise an internal pressure of a drum thereof. However, increasing the internal pressure of the drum or providing a high-strength water pipe deteriorates safety in operation of the boiler, causing accidents.

DISCLOSURE OF INVENTION

Technical Problem

Therefore, the present invention has been made in view of the above problems, and it is an object of the present invention to provide a once-through boiler in which steam is introduced from a steam supply chamber into a combustion chamber to be reheated therein to thereby achieve a steep increase in a temperature of the steam, resulting in improved heat efficiency and energy efficiency of the boiler.

It is another object of the present invention to provide a once-through boiler which can easily generate high-temperature steam using conventional water pipes, thereby reducing manufacturing and material costs of the boiler.

It is yet another object of the present invention to provide a once-through boiler which can safely generate high-temperature steam without increasing the internal pressure of a drum, thereby achieving operational safety of the boiler.

Technical Solution

In accordance with an aspect of the present invention, the above and other objects can be accomplished by the provision of a once-through boiler wherein a primarily generated steam is again introduced into a combustion chamber to be reheated to thereby be converted into a high-temperature steam, the once-through boiler having a low-temperature steam discharge pipe and a high-temperature steam outlet pipe which communicate with each other and are controlled in opening degrees thereof to achieve a desired temperature of steam.

Preferably, a steam heating pipe, adapted to reheat the steam introduced into the combustion chamber, may be located in a lower region of the combustion chamber close to an inner circumference of the combustion chamber so as not to come into direct contact with a flame during heating of the steam.

Preferably, the steam heating pipe may have a coil shape, loop shape, or a combined shape thereof.

Advantageous Effects

The present invention provides the following advantages.

Firstly, a once-through boiler of the present invention can achieve a steep increase in a temperature of steam via reheating of the steam within a combustion chamber, thereby improving heat efficiency and energy efficiency thereof.

Secondly, the once-through boiler of the present invention can easily generate high-temperature steam by means of conventional water pipes. This is effective to reduce manufacturing and material costs of the once-through boiler.

Thirdly, the once-through boiler of the present invention can safely generate high-temperature steam without increasing the internal pressure of a drum, resulting in improved operational safety.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a perspective view of a once-through boiler according to the present invention;

FIG. 2 is a sectional view of the once-through boiler of FIG. 1;

FIG. 3 is a perspective view of a steam heating pipe according to a first embodiment of the present invention;

FIG. 4 is a perspective view of a steam heating pipe according to a second embodiment of the present invention; and FIG. 5 is a perspective view of a steam heating pipe according to a third embodiment of the present invention.

BEST MODE FOR CARRYING OUT THE INVENTION

Now, a preferred embodiment of the present invention will be explained with reference to the accompanying drawings.

FIG. 1 is a perspective view of a once-through boiler according to the present invention. FIG. 2 is a sectional view of the once-through boiler of FIG. 1. FIG. 3 is a perspective view of a steam heating pipe according to a first embodiment of the present invention. FIG. 4 is a perspective view of a steam heating pipe according to a second embodiment of the present invention. FIG. 5 is a perspective view of a steam heating pipe according to a third embodiment of the present invention.

As shown in FIGS. 1 to 5, the once-through boiler 100 of the present invention comprises a body 110, a steam supply unit 120, and a heating unit 130. The body 110 includes a housing 111 having an open upper side, a cover 112 coupled to the open upper side of the housing 111, and a guide pipe 113 extending downward from the center of the cover 112. The steam supply unit 120 includes an annular water tank 122 mounted in a lower region of the body 110, a steam supply chamber 124 defined in an uppermost region of the body 110, a plurality of upright water pipes 121 extending upward from the water tank 122 and arranged in an arc pattern, a low-temperature steam inlet pipe 125 and a high-temperature steam outlet pipe 127 mounted at opposite ends of the arc pattern of the water pipes 121, and a steam heating pipe 126 to communicate the low-temperature steam inlet pipe 125 with the high-temperature steam outlet pipe 127. The heating unit 130 includes a burner 131 mounted in the guide pipe 113, that is provided at the cover 112 of the body 110, to slightly protrude downward from the guide pipe 113, a combustion chamber 132 defined between the burner 131 and the water tank 122, and a plate 136 to define an upper end of the combustion chamber 132 and coupled with both the guide pipe 113 and the water pipes 121.

An insulating sheet 114 is attached to an inner circumferential surface of the body 110 to maximize heat insulation.

Considering the steam supply unit 120 in detail, the plurality of water pipes 121 are arranged in the arc pattern, and the low-temperature steam inlet pipe 125 and the high-temperature steam outlet pipe 127, having blinded lower ends, are located on the same arc pattern while being communicated with each other via the steam heating pipe 126. Preferably, the steam heating pipe 126 has a coil shape, and is located close to an inner circumference of the combustion chamber 132. This configuration of the steam heating pipe 126 is effective to prevent collision of a flame from the burner 131.

The steam heating pipe 126 is located in a lower region of the combustion chamber 132. This prevents the steam heating pipe 126 from coming into direct contact with the widest center portion of the flame.

Preferably, the steam heating pipe 126 occupies the lower 38% of the combustion chamber 132.

In addition to the coil shape, the steam heating pipe 126 may have a loop shape, or a combined shape thereof.

Preferably, a lower end of the steam heating pipe 126 communicates with the low-temperature steam inlet pipe 125, and an upper end of the steam heating pipe 126 communicates with the high-temperature steam outlet pipe 127. This enables resultant heated steam to be discharged to the outside while keeping the best state to the end.

Meanwhile, upper ends of the water pipes 121 of the steam supply unit 120 communicate with the steam supply chamber 124. Also, a low-temperature steam discharge pipe 128 is vertically penetrated through the cover 112. With this configuration, low-temperature steam, which is heated in the water pipes 121, is able to be discharged to the outside via the low-temperature steam discharge pipe 128.

Preferably, the low-temperature steam discharge pipe 128 and the high-temperature steam outlet pipe 127 are designed to communicate with each other, and control valves 129 are mounted, respectively, to the low-temperature steam discharge pipe 128 and the high-temperature steam outlet pipe 127 to control a temperature of the resultant steam.

The steam supply unit 120 further comprises a raw water supply pipe 123 connected to the water tank 122 and having a control valve to continuously maintain a constant flow rate of raw water passing through the water pipes 121.

The heating unit 130 further includes an exhaust chamber 134 defined underneath the water tank 122 to communicate with the combustion chamber 132. For the communication between the combustion chamber 132 and the exhaust chamber 134, a plurality of exhaust tubes 133 are penetrated through the water tank 122. Also, an exhaust pipe 135 is connected to a lateral side of the exhaust chamber 134 to smoothly discharge exhaust gas to the outside.

Now, the operation of the once-through boiler according to the present invention will be explained.

First, raw water is supplied to the water tank 122 via the raw water supply pipe 123 so that an appropriate amount of the raw water is supplied to the plurality of water pipes 121.

Then, as the burner 131 is ignited to heat the combustion chamber 132, the resulting heat is conducted to the water pipes 121 and the water tank 122 to thereby heat the raw water filled therein.

As a result of heating, the raw water, filled in the water pipes 121, is evaporated, allowing the steam supply chamber 124 to be filled with steam. In this way, the steam, having a temperature lower than 100 degrees Celsius, is discharged to the outside via the low-temperature steam discharge pipe 128 having a relatively low pressure.

Alternatively, when it is desired to discharge high-temperature steam having a temperature of approximately 600 degrees Celsius to the outside, the control valve 129 mounted to the low-temperature steam discharge pipe 128 is closed, while the control valve 129 mounted to the high-temperature steam outlet pipe 127 is opened, so that the low-temperature steam to be introduced into the low-temperature steam inlet pipe 125.

The low-temperature steam, introduced into the low-temperature steam inlet pipe 125, is reheated while passing through the steam heating pipe 126 mounted in the combustion chamber 132 to thereby be discharged to the outside via the high-temperature steam outlet pipe 127 in a high-temperature steam state.

Alternatively, when it is desired to supply steam having a temperature in a range of 100 to 600 degrees Celsius, the injection amount of fuel of the burner 131 is adjusted, or opening degrees of the control valves 129, mounted to both the low-temperature steam discharge pipe 128 and the high-temperature steam outlet pipe 127, are adjusted to control circulation of steam. Through the control of steam circulation, a mixture of high-temperature steam and low-temperature steam is able to be discharged to the outside.

With this steam generating operation, high-temperature steam can be safely supplied with negligible pressure variation. This is effective to reduce fuel and time consumption as well as equipment costs, and to achieve operational safety of the once-through boiler 100.

Also, since the temperature of the steam is flexibly variable, the once-through boiler 100 is used to smoothly supply a desired temperature of steam depending on the application thereof.

INDUSTRIAL APPLICABILITY

As is apparent from the above description, the present invention provides a once-through boiler which can achieve a steep increase in a temperature of steam via reheating of the steam within a combustion chamber, thereby improving heat efficiency and energy efficiency thereof.

Further, according to the present invention, the boiler can easily generate high-temperature steam by means of conventional water pipes. This is effective to reduce manufacturing and material costs of the once-through boiler.

Furthermore, the once-through boiler according to the present invention can safely generate high-temperature steam without increasing the internal pressure of a drum, resulting in improved operational safety.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A once-through boiler, wherein a primarily generated low-temperature steam, filled in a steam supply chamber, is introduced into a low-temperature steam inlet pipe to be reheated while passing through a steam heating pipe mounted in a combustion chamber, thereby being discharged to the outside via a high-temperature steam outlet pipe in a high-temperature steam state, wherein:

the high-temperature steam outlet pipe communicates with a low-temperature steam discharge pipe; and control valves are mounted, respectively, to both the low-temperature steam discharge pipe and the high-temperature steam outlet pipe to control a temperature of the steam.

2. The boiler as set forth in claim 1, wherein the steam heating pipe, adapted to reheat the low-temperature steam introduced into the combustion chamber, is located in a lower region of the combustion chamber close to an inner circumference of the combustion chamber so as not to come into direct contact with a flame during heating of the steam.

3. The boiler as set forth in claim 2, wherein the steam heating pipe has a coil shape, loop shape, or a combined shape thereof.

* * * * *